United States Patent
Bordia et al.

(10) Patent No.: US 11,829,647 B1
(45) Date of Patent: Nov. 28, 2023

(54) STORAGE SYSTEM AND METHOD FOR USING A QUEUE MONITOR IN A BLOCK ALLOCATION PROCESS

(71) Applicant: Western Digital Technologies, Inc., San Jose, CA (US)

(72) Inventors: Kalpit Bordia, Karnataka (IN); Disha Gundecha, Maharashtra (IN); Raviraj Raju, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 15 days.

(21) Appl. No.: 17/828,285

(22) Filed: May 31, 2022

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0604; G06F 3/0659; G06F 3/0679
See application file for complete search history.

(56) References Cited

U.S. PATENT DOCUMENTS

| | | | |
|---|---|---|---|
| 9,251,891 B1 * | 2/2016 | Hu | G11C 16/26 |
| 11,158,392 B2 * | 10/2021 | Muchherla | G11C 16/349 |
| 2009/0193184 A1 * | 7/2009 | Yu | G06F 12/0246 |
| | | | 711/E12.001 |
| 2018/0081543 A1 * | 3/2018 | Muchherla | G06F 3/0604 |
| 2022/0206920 A1 * | 6/2022 | Bhat | G06F 3/0653 |

* cited by examiner

*Primary Examiner* — Aracelis Ruiz
(74) *Attorney, Agent, or Firm* — Crowell & Moring LLP

(57) ABSTRACT

A storage system has a memory with a multi-level cell (MLC) block that can store multiple bits per cell or can be constrained to store only one bit per cell. Using the MLC block to store only one bit per cell can increase the performance of the storage system but can also reduce endurance of the MLC block. The storage system can monitor a command queue to determine the performance needed. With that information, the storage system can determine whether it is worth making the tradeoff of increasing performance at the cost of endurance.

19 Claims, 7 Drawing Sheets

STORAGE SYSTEM AND METHOD FOR USING A QUEUE MONITOR IN A BLOCK ALLOCATION PROCESS

BACKGROUND

A host can send a write command to store data in a memory of a storage system. The memory of the storage system can have single-level cell (SLC) blocks and multi-level cell (MLC) blocks. In some situations, an MLC block can be temporarily used to store just a single bit per cell. An MLC block used in this matter is sometimes referred to as a hybrid SLC block. While hybrid SLC utilization can be used to boost performance, that improvement comes at the cost of endurance.

DETAILED DESCRIPTION

The following embodiments generally relate to a storage system and method for using a queue monitor in a block allocation process. In one embodiment, a storage system is provided comprising a memory comprising a multi-level cell (MLC) block and a controller. The controller is configured to analyze commands in a command queue to determine a performance requirement; determine whether the performance requirement will be satisfied if the MLC block is allocated as a dedicated MLC block that stores multiple bits per memory cell; in response to determining that the performance requirement will be satisfied, allocating the MLC block as a dedicated MLC block; and in response to determining that the performance requirement will not be satisfied, allocating the MLC block as a hybrid single-level cell (hSLC) block that stores only a single bit per memory cell.

In another embodiment, a method is provided that is performed in a storage system comprising a memory comprising a multi-level cell (MLC) block. The method comprises: monitoring a command queue to determine if any pre-defined special commands are found; receiving an allocation request; and based on the monitoring of the command queue, determining whether to allocate the MLC block as a dedicated MLC block that stores multiple bits per memory cell or as a hybrid single-level cell (hSLC) block that stores only a single bit per memory cell.

In yet another embodiment, a storage system is provided comprising a memory comprising a multi-level cell (MLC) block; means for monitoring a command queue to determine a required bandwidth; and means for using the MLC block to store multiple bits per memory cell in response to such use providing the required bandwidth; otherwise, using the MLC block to store only one bit per memory cell.

Other embodiments are provided and can be used alone or in combination.

Figure 1A:
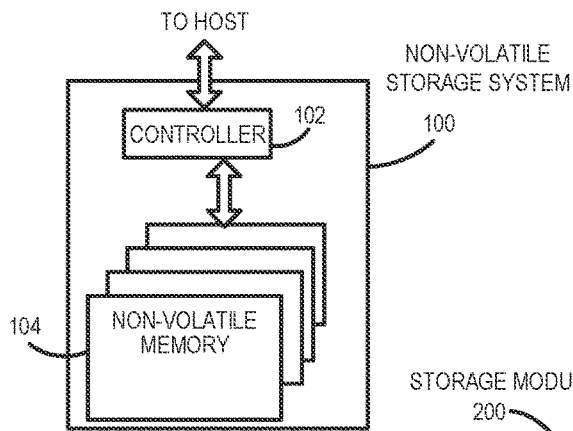
FIG. 1A is a block diagram of a non-volatile storage system of an embodiment.
Figure 1B:
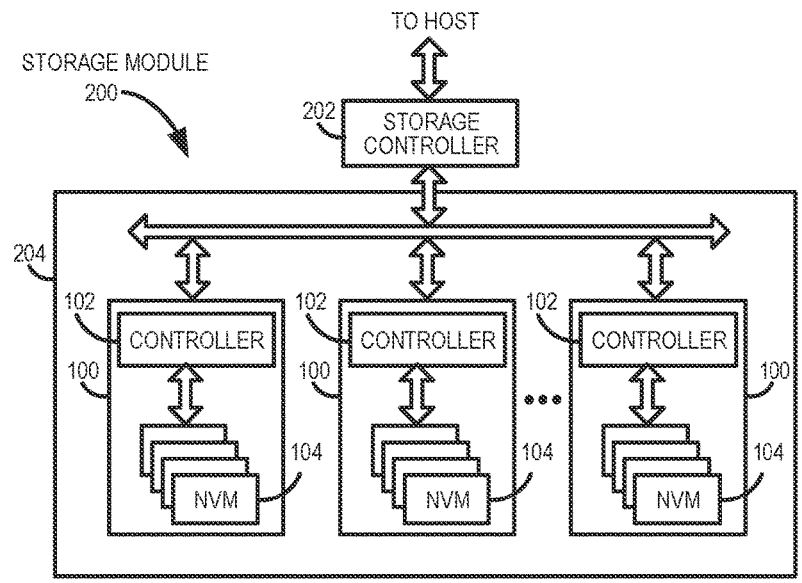
FIG. 1B is a block diagram illustrating a storage module of an embodiment.
Figure 1C:
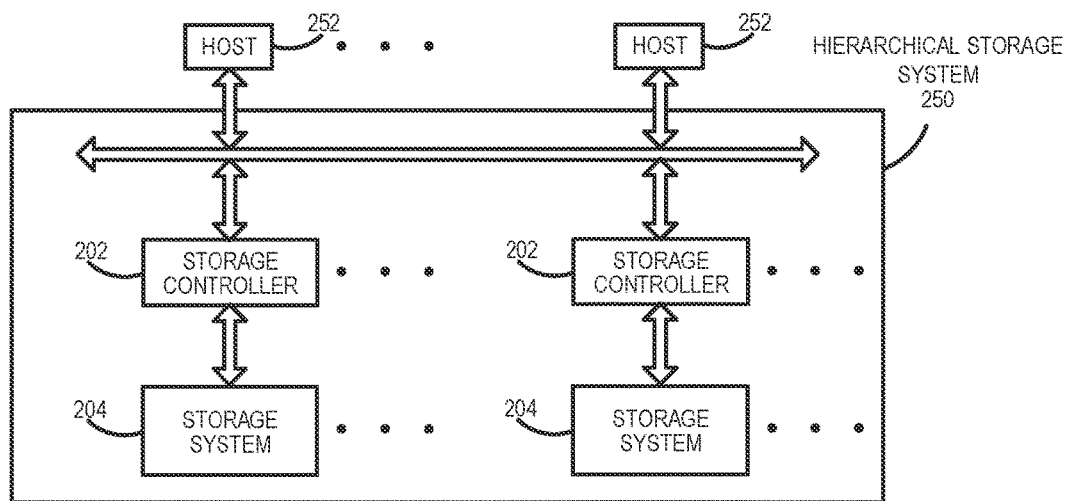
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory cells that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level (one-bit per cell) cells (SLC) or multiple-level cells (MLC), such as two-level cells, triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
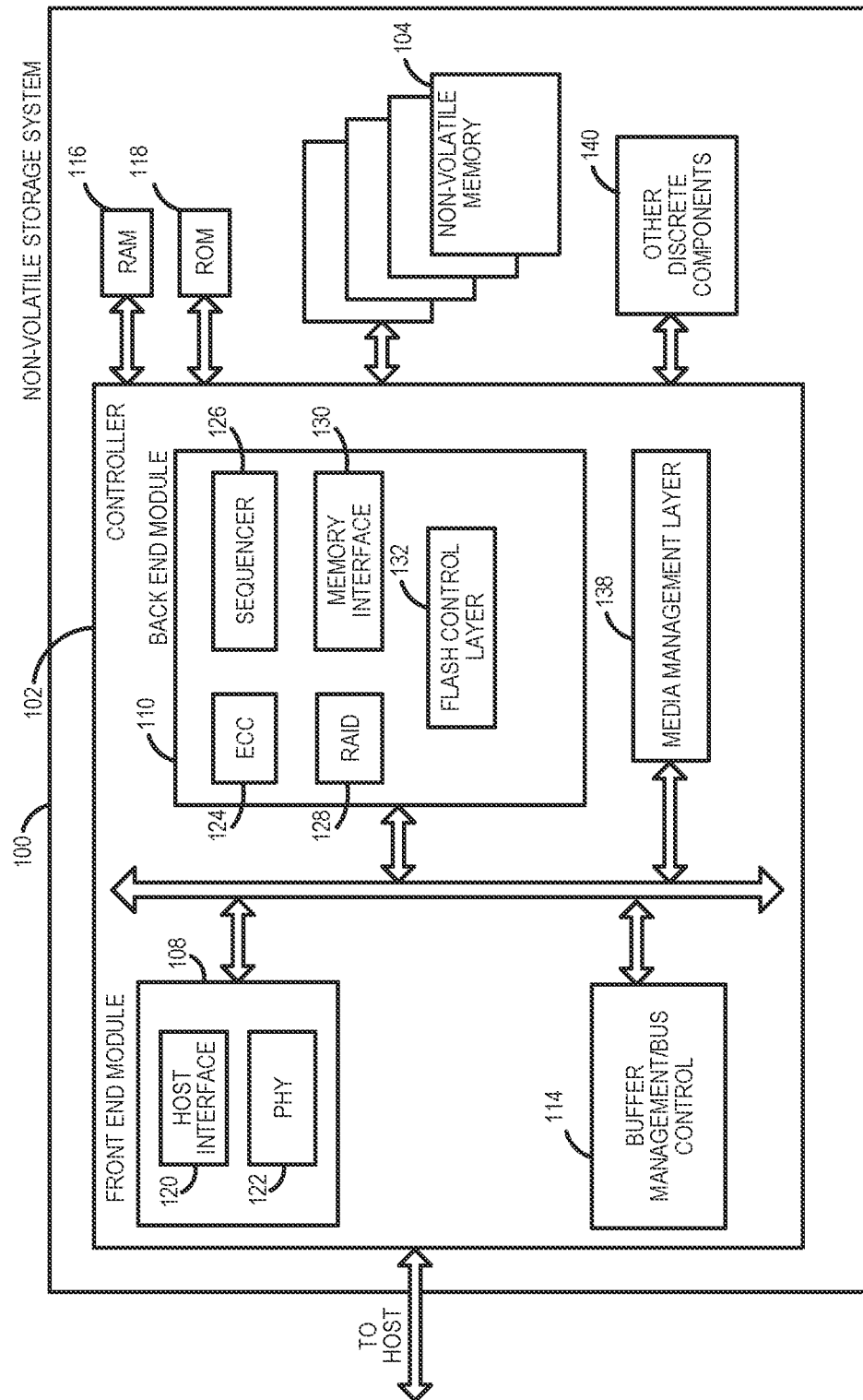
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
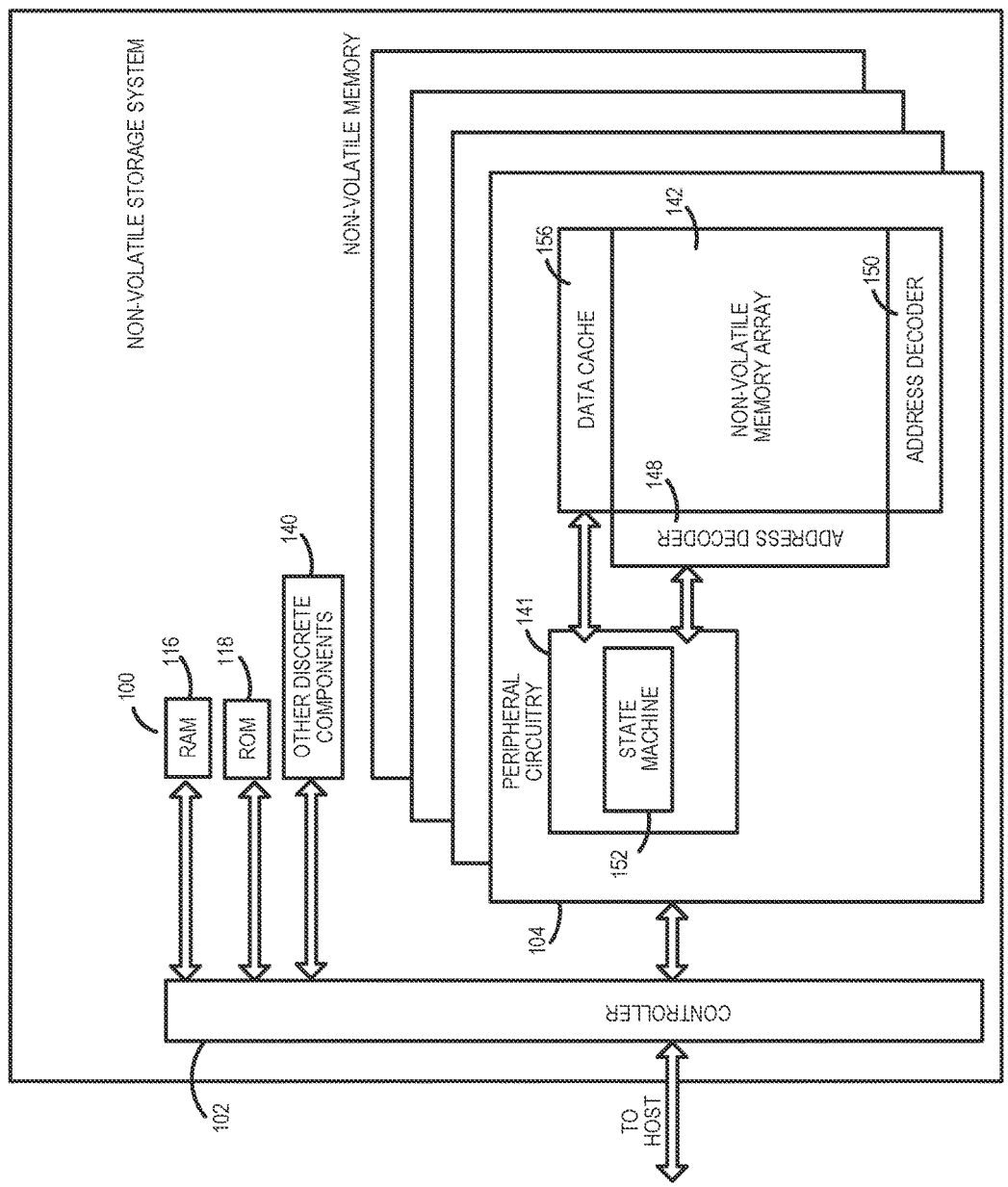
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block of memory cells. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
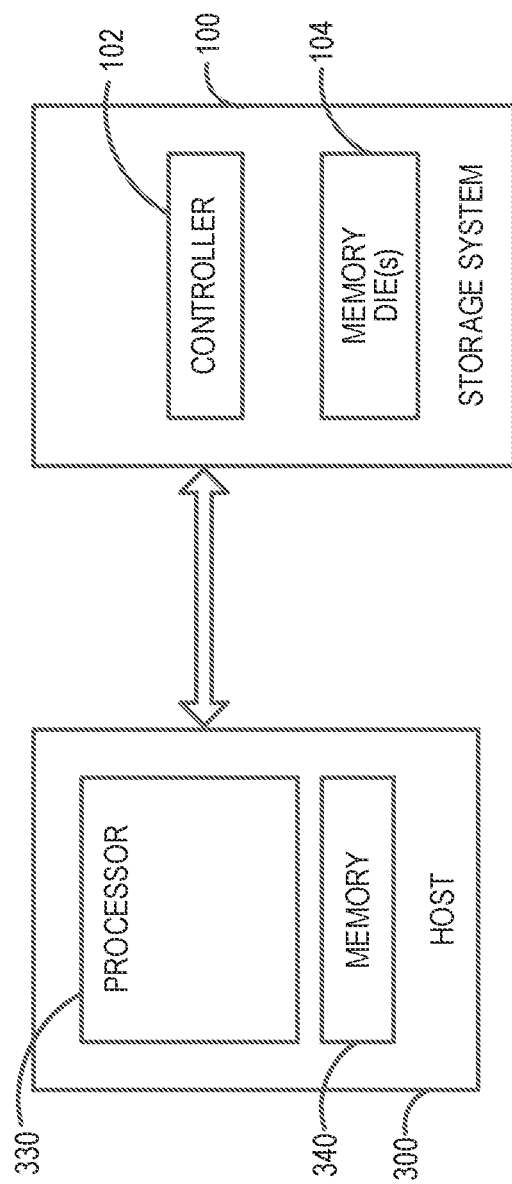
FIG. 3 is a block diagram of a host and storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

As mentioned above, the memory 104 can have single-level cell (SLC) blocks and multi-level cell (MLC) blocks. In some situations, an MLC block can be temporarily used to store just a single bit per cell. An MLC block used in this matter will be referred to herein as a hybrid SLC (hSLC) block. While hybrid SLC utilization can be used to boost performance, that improvement comes at the cost of endurance. However, if the storage system 100 is not bottlenecked by the non-volatile memory 104 and can accurately predict the required memory bandwidth and bottlenecks, it could potentially avoid decreased endurance in such cases.

Modern storage systems, such as solid-state drives (SSDs), can support high bandwidths of data transfer. For example, a typical SSD can perform reads/writes at ~4 GB/s. However, such performance may require a high queue depth with a sizeable workload, and performance can be restricted in storage systems that have a low queue depth or use random workloads with a 4 KB payload size per command (e.g., due to host latencies in queuing up the next command and firmware table update latencies). Performance can also be restricted when the storage system receives special commands from the host, such as, for example, an administrative (admin) command, an unaligned write command, an overlap write command, a deallocation command, or a trim command.

The following embodiments can be used to predict such cases where the storage system does not need complete memory bandwidth and, hence, could reduce hybrid allocation and improve endurance. In one embodiment, the storage system's controller (e.g., using firmware, software, or hardware) monitors all the commands that are queued up in storage system 100, even those command that have not yet started processing. The controller 102 can also measure and calibrate (e.g., either via training or a fixed input) the host latency (the rate at which the host 300 can schedule commands back-to-back) and the firmware latency in the read and write paths in the storage system 100. The controller 102 can also monitor incoming special commands and depth of commands other than read and write commands, such as, for example, forced unit access (FUA) commands, trim commands, admin commands, unaligned write commands, and security/vendor specific commands. The feedback from this monitoring can be in terms of the required bandwidth for the queued commands, if the current queue depth is maintained by the host 300, based on potential bottlenecks in the flow given the current host and firmware latencies.

As mentioned above, in one embodiment, the storage system's controller 102 monitors bandwidth. For example, assume that the SLC bandwidth for the storage system 100, which can depend on toggle mode and tProg, is 4 GB/s. Also assume that TLC writes are five times slower than SLC writes. So, the TLC bandwidth would be ~800 MB/s. Given a random write scenario, the storage system 100 is primarily bottlenecked by firmware latencies to process each 4K payload. Firmware bandwidth in such cases would be (~2 uSec per 4K), which is ~2 GB/s or 500 KIO/s. Regarding host latencies, there can be different kind of bottlenecks. For example, assuming the host turnaround time (HTAT) for a random write command to maintain a queue depth of one for 4K is ~20 uSec, the host bandwidth is ~50 KIO/s or 200 MB/s, which is much less than the storage system's bandwidth. Similarly, if the transfer size or queue depth is higher, the HTAT can be detected based on last completion to next submission.

Hence, if we consider a sustained workload of random writes that are 4 KB/8 KB in length and with a queue depth of ½, the storage system 100 needs a bandwidth of ~150-200 KIO/s, i.e., 600-800 MB/s. In such cases, if the storage system 100 can predict the required bandwidth based on the host workload, it can be utilized to detect if there should be hybrid allocation, and, if there should be, in what ratios to ensure that the hybrid blocks are not overused. Similarly, if the storage system 100 can detect multiple incoming unaligned writes, multiple trims, etc., the controller 102 can move the storage system 100 into a delayed hybrid allocation state. In this state, the controller 102 can monitor if the total unaligned/overlap/RMW (read-modify-write) commands cross a certain threshold limit. Hybrid allocation can be performed after these kinds of the command are no longer queued.

This bandwidth feedback from the controller's queue monitor can also allow multiple relocation thresholds, where the storage system 100 can retain the current physical-fullness-based trigger but, given the feedback from the queue monitor, can also perform age-based relocation on any data deemed cold enough for foreground relocation when the bandwidth from the host 300 is not required. Similarly, in thermal conditions, the controller 102 can detect if there is a large command build-up or low-bandwidth requirement and determine optimal hybrid SLC utilization when allowed by allocation algorithms. This can help perform fast, low-power writes (due to SLC), which could help avoid thermal extremes while still maintaining storage system performance and provide better cooling for same host workload in a storage system that does not have this capability.

Figure 4:
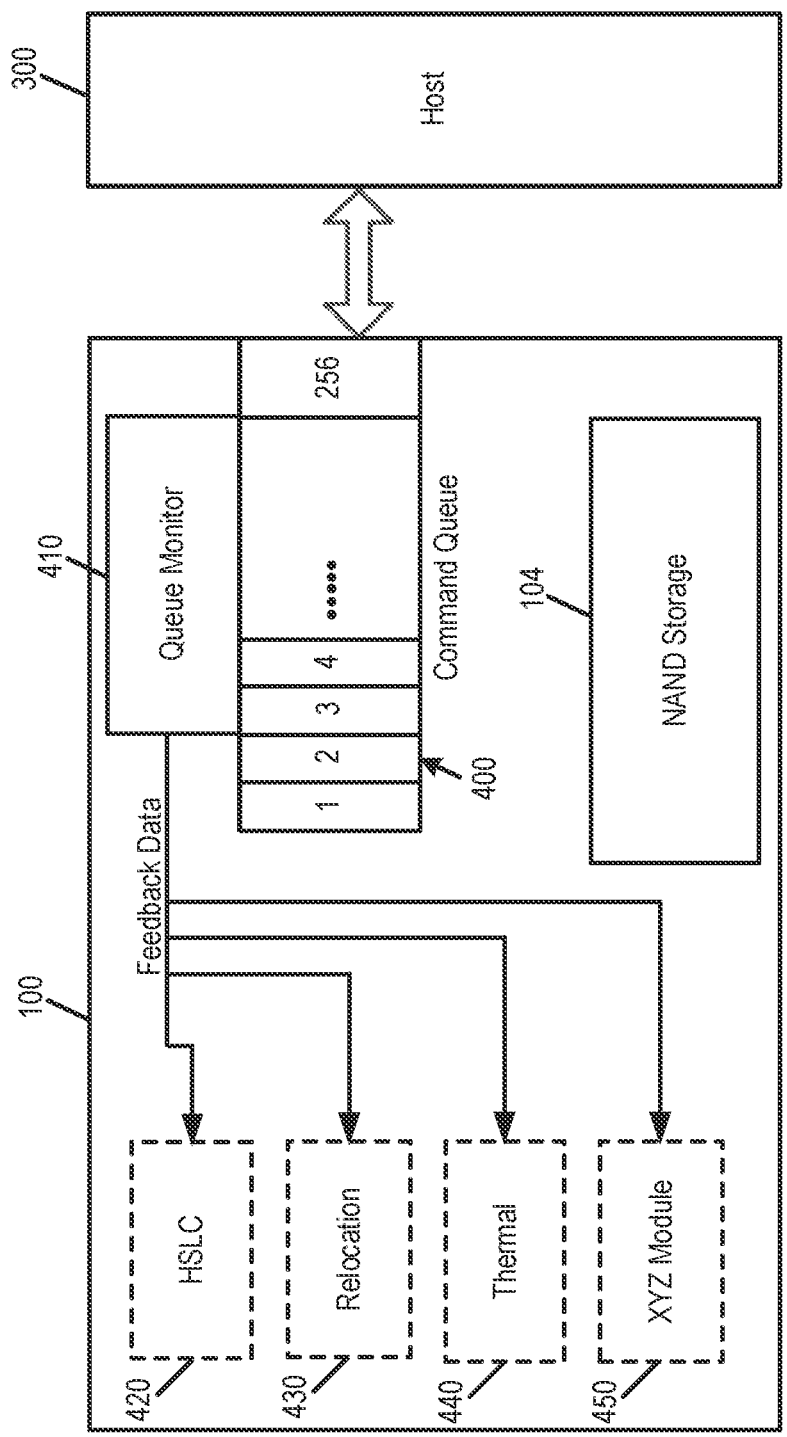
FIG. 4 is a diagram of a queue-monitor-based feedback mechanism of an embodiment for different firmware routing use cases.

Turning again to the drawings, FIG. 4 is a block diagram of a storage system that has a command queue 400 and a queue monitor 410 that monitors the command queue 400. The command queue 400 can be implemented in the controller 102 of the storage system 100. As shown in FIG. 4, the queue monitor 410 provides feedback data regarding the command queue to several modules in the storage system 100: an hSLC module 420, a relocation module 430, a thermal module 440, and any other type of suitable module, represented in FIG. 4 as an XYZ module 450. It should be noted that this is merely an example, and fewer or other modules can be used. As explained above, the queue monitor 410 allows for better hybrid SLC allocation based on multiple feedback generated as part of the look-ahead on the command queue 400.

Figure 5:
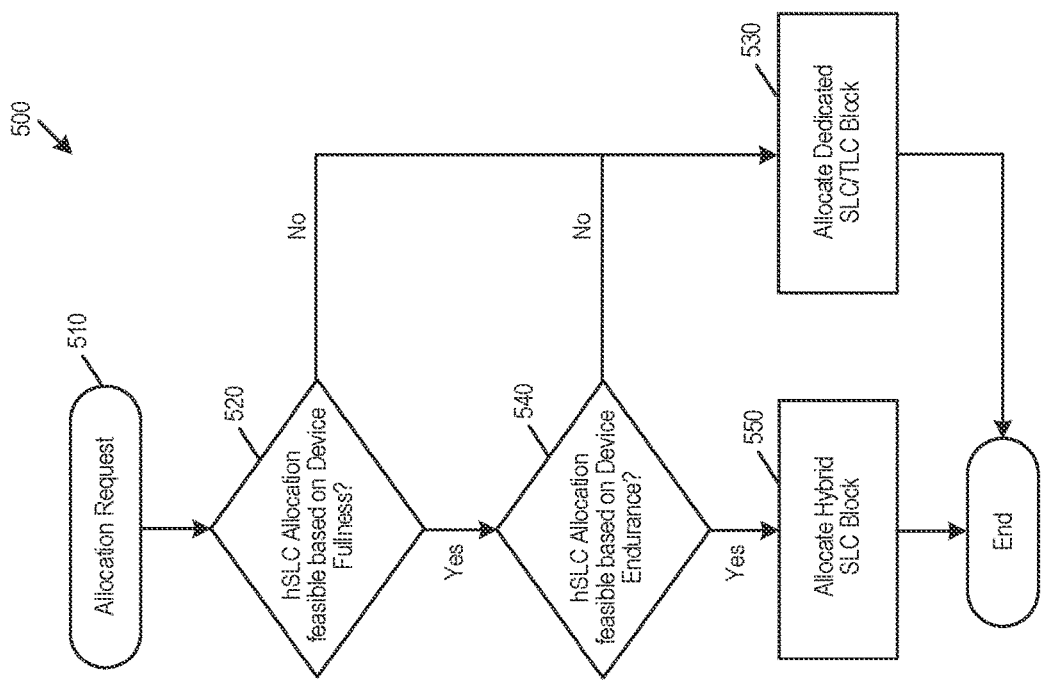
FIG. 5 is a flow chart of a method of an embodiment using a hybrid single-level cell (SLC) allocation mechanism without a queue monitor check.
Figure 6:
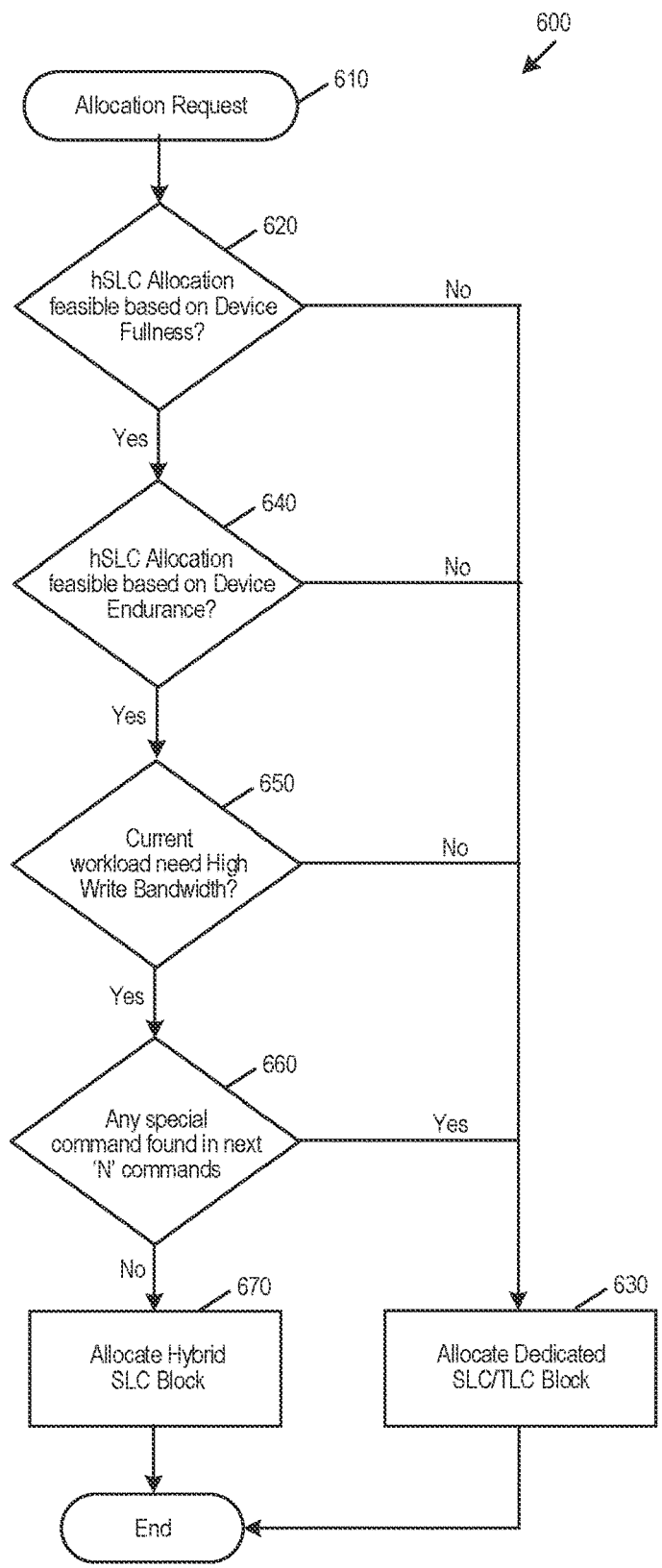
FIG. 6 is a flow chart of a method of an embodiment using an improved hybrid single-level cell (SLC) allocation mechanism.

FIG. 5 is a flow chart 500 that shows multiple possible scenarios of hybrid allocation without any forms of feedback. As shown in FIG. 5, after the controller 102 receives an allocation request (act 510), the controller 102 determines if hSLC allocation is feasible based on the fullness of the memory 104 (act 520). If hSLC allocation is not feasible, the controller 102 allocates a dedicated SLC/TLC block (act 530). However, if hSLC allocation is feasible, the controller 102 determines if hSLC allocation is feasible based on the endurance of the memory 104 (act 540). If hSLC allocation is not feasible, the controller 102 allocates a dedicated SLC/TLC block (act 530). However, if hSLC allocation is feasible, the controller 102 allocates the hybrid SLC block (act 550). In another embodiment shown in the flow chart 600 of FIG. 6, after the controller 102 receives a relocation request (act 610), the controller 102 determines if hSLC allocation is feasible based on the fullness of the memory 104 (act 620). If hSLC allocation is not feasible, the controller 102 allocates a dedicated SLC/TLC block (act 630). However, if hSLC allocation is feasible, the controller 102 determines if hSLC allocation is feasible based on the endurance of the memory 104 (act 640). If hSLC allocation is not feasible, the controller 102 allocates a dedicated SLC/TLC block (act 630). However, if hSLC allocation is feasible, the controller 102 determines if the current workload needs a high write bandwidth (act 650). If the current workload does not need a high write bandwidth (act 650), the controller 102 allocates a dedicated SLC/TLC block (act 630). However, if the current workload does need a high write bandwidth, the controller 102 determines if any special command is found in the next N number of commands (act 660). If a special command is found in the next N number of commands, the controller 102 allocates a dedicated SLC/TLC block (act 630). However, if no special commands are found in the next N number of commands, the controller 102 allocates a hybrid SLC block (act 670).

Upon detecting a workload that is either host- or firmware-bottlenecked, the controller 102 can initiate a folding-based relocation in small ratios, which could allow small relocation work in the holes of memory performance. Since folding is primarily memory bottlenecked, it could allow efficient memory utilization. For example, consider a memory bandwidth of 4 GB/s in SLC mode and 800 MB/s in TLC mode. If, for example, the storage system 100 only needs 2 GB/s of memory performance for burst random writes, it could potentially use the remaining idle memory time to perform a small relocation step or any other memory maintenance activity without impacting host performance. More generally, the controller 102 can define ratios and triggers for such work to be performed.

There are several advantages associated with these embodiments. For example, these embodiments can be used to perform a small queue look-ahead to try and predict the host workload and also monitor the host latencies, which can allow determination of required bandwidth on the storage system side. This feedback can then be used by the controller 102 in various ways (e.g., in the hybrid SLC and relocation modules) to allow optimal allocation. Better hybrid SLC utilization can result in improved endurance where workload detection is accurate, especially in cases such as JEDEC workload, which can have many unaligned writes, low queue depth random workload, and many trims commands. The feedback provided by these embodiments can also help in better thermal management and foreground relocation. Additionally, these embodiments can be used to provide storage system profiles based on this criterion, which can then be used to manage different modules, such as SRAM.

Finally, as mentioned above, any suitable type of memory can be used. Semiconductor memory devices include volatile memory devices, such as dynamic random access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional (2D) memory structure or a three dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A storage system comprising:
    a memory comprising a multi-level cell (MLC) block; and
    a controller coupled with the memory and configured to:
        analyze commands in a command queue to determine a performance requirement;
        determine whether the performance requirement will be satisfied if the MLC block is allocated as a dedicated MLC block that stores multiple bits per memory cell;
        in response to determining that the performance requirement will be satisfied, allocating the MLC block as a dedicated MLC block; and
        in response to determining that the performance requirement will not be satisfied, allocating the MLC block as a hybrid single-level cell (hSLC) block that stores only a single bit per memory cell.

2. The storage system of claim 1, wherein the controller is further configured to determine the performance requirement based on a rate at which a host schedules commands in the command queue.

3. The storage system of claim 1, wherein the controller is further configured to determine the performance requirement based on a latency in a read and/or write path in the storage system.

4. The storage system of claim 1, wherein the controller is further configured to determine the performance requirement based on whether the command queue comprises one or more of the following: a forced unit access (FUA) command, a trim command, an administrative command, an unaligned write command, a security command, or a vendor-specific command.

5. The storage system of claim 1, wherein the controller is further configured to determine the performance requirement based on a thermal condition of the storage system.

6. The storage system of claim 1, wherein the controller is further configured to determine a ratio of dedicated MLC blocks and hSLC blocks.

7. The storage system of claim 1, wherein the controller is further configured to place the storage system in a delayed hybrid allocation state.

8. The storage system of claim 1, wherein the controller is further configured to analyze commands in the command queue to determine whether to perform an age-based relocation process.

9. The storage system of claim 1, wherein the controller is further configured to perform a folding operation to help satisfy the performance requirement.

10. The storage system of claim 1, wherein the memory comprises a three-dimensional memory.

11. In a storage system comprising a memory comprising a multi-level cell (MLC) block, a method comprising:
   monitoring a command queue;
   receiving an allocation request; and
   based on the monitoring of the command queue, determining whether to allocate the MLC block as a dedicated MLC block that stores multiple bits per memory cell or as a hybrid single-level cell (hSLC) block that stores only a single bit per memory cell.

12. The method of claim 11, wherein the determining is based on fullness of the memory.

13. The method of claim 11, wherein the determining is based on endurance of the memory.

14. The method of claim 11, wherein the determining is based on a needed write bandwidth.

15. The method of claim 11, wherein the determining is based on whether the command queue comprises one or more of the following: a forced unit access (FUA) command, a trim command, an administrative command, an unaligned write command, a security command, or a vendor-specific command.

16. The method of claim 11, further comprising performing a thermal management operation based on the monitoring.

17. The method of claim 11, further comprising performing a foreground relocation operation based on the monitoring.

18. The method of claim 11, wherein the memory comprises a three-dimensional memory.

19. A storage system comprising:
   a memory comprising a multi-level cell (MLC) block;
   means for monitoring a command queue to determine a required bandwidth; and
   means for using the MLC block to store multiple bits per memory cell in response to such use providing the required bandwidth; otherwise, using the MLC block to store only one bit per memory cell.

* * * * *